C. V. DEAN.
TILTING HEADLIGHT.
APPLICATION FILED MAR. 21, 1916.

1,212,191.

Patented Jan. 16, 1917.
2 SHEETS—SHEET 1.

Inventor
Charles V. Dean
By Moulton & Liverance
Attorneys.

C. V. DEAN.
TILTING HEADLIGHT.
APPLICATION FILED MAR. 21, 1916.
1,212,191.
Patented Jan. 16, 1917.
2 SHEETS—SHEET 2.
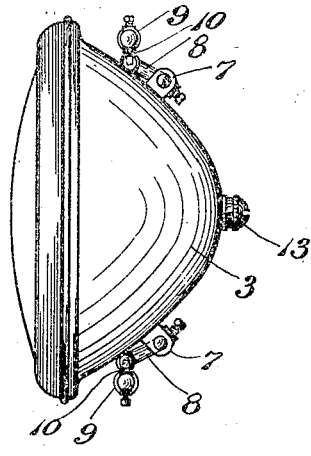
Fig. 6.
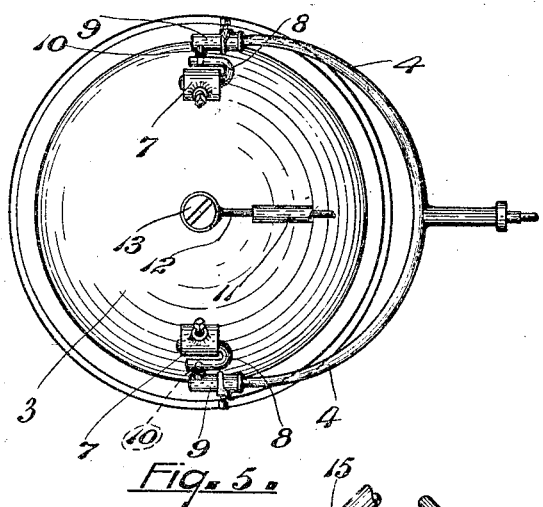
Fig. 5.
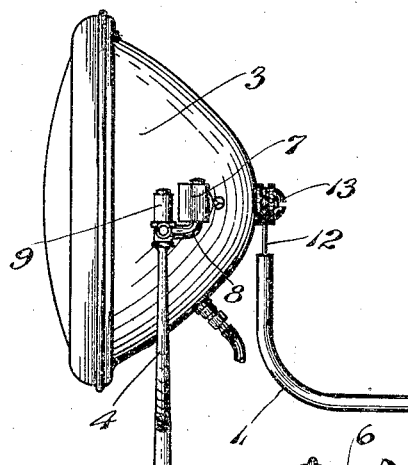
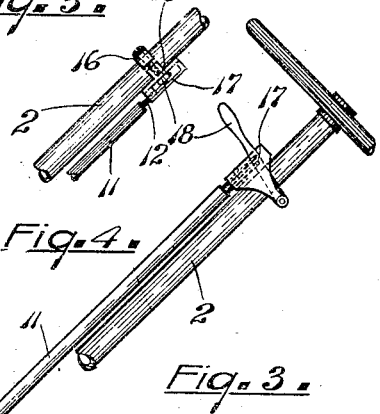
Fig. 4.
Fig. 3.
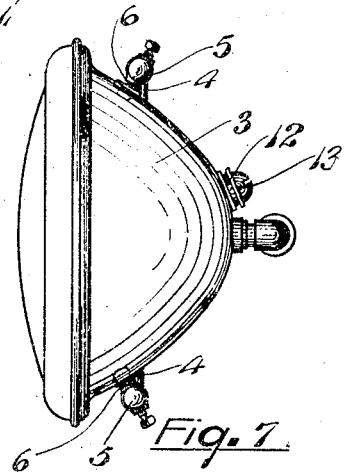
Fig. 7.
Inventor
Charles V. Dean
By Moulton & Livrance
Attorneys.

UNITED STATES PATENT OFFICE.

CHARLES V. DEAN, OF GRAND RAPIDS, MICHIGAN.

TILTING HEADLIGHT.

1,212,191. Specification of Letters Patent. Patented Jan. 16, 1917.

Application filed March 21, 1916. Serial No. 85,610.

*To all whom it may concern:*

Be it known that I, CHARLES V. DEAN, a citizen of the United States of America, residing at Grand Rapids, in the county of Kent and State of Michigan, have invented certain new and useful Improvements in Tilting Headlights; and I do hereby declare the following to be a full, clear, and exact description of the invention, such as will enable others skilled in the art to which it appertains to make and use the same.

Figure 1:
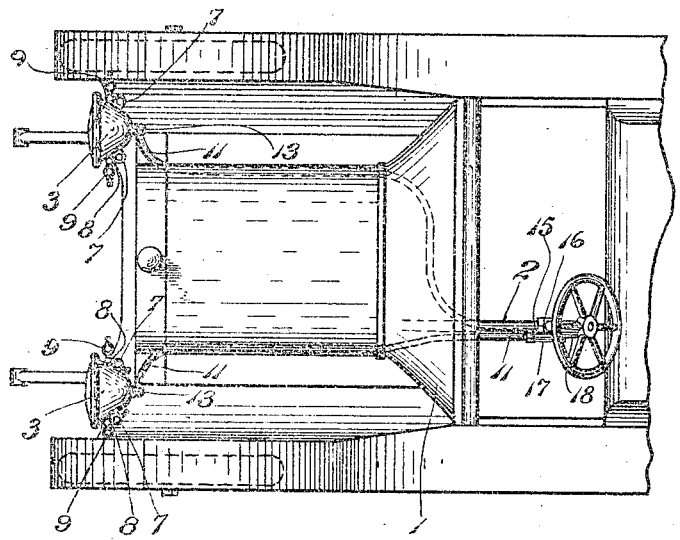
Figure 2:
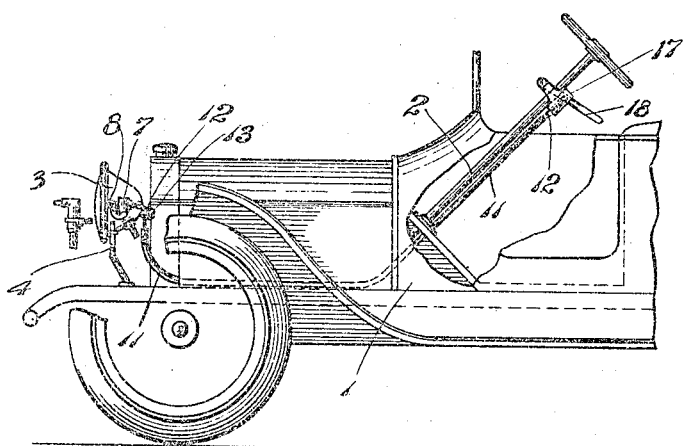

This invention relates to a tilting headlight construction and control therefor of especial adaptation for use in motor vehicles, it being an object and purpose of the present invention to provide a very simple and economically constructed control for headlights, whereby they may be tilted to direct light to points immediately in front of the vehicle, this eliminating the intense glare of the light and serving to safeguard others meeting the vehicle; while at the same time the tilting of the lights does not reduce the amount of light available upon the road but in fact presents it at its full intensity directly in front of the vehicle where it is of the greatest value at night. To attain this primary object together with other subsidiary objects not specifically enumerated but which will appear as the description progresses, I have embodied my invention in constructions disclosed in the accompanying drawings, in which;

Figure 1 is a plan view of the front portion of a motor vehicle equipped with my invention. Fig. 2 is a side elevation with parts broken away to better disclose the structure of the invention. Fig. 3 is a side elevation of the essential elements of the invention disassociated from the motor vehicle. Fig. 4 is a plan view of the lever control connected to the steering post of the vehicle. Fig. 5 is a rear elevation of a tilting head light. Fig. 6 is a plan view thereof; and Fig. 7 is a plan view of a modified construction of tilting headlight.

Like reference characters refer to like parts throughout the several views of the drawings.

The motor vehicle 1 is of any preferred construction and has the usual steering post 2 and headlights 3 which are supported by brackets having diverging arms 4 between which the lights are mounted. Ordinarily the lights 3 are fastened rigidly to brackets of this character but in my invention each vertical arm 4 of the bracket is equipped with a sleeve 5 from which projects a pivot member 6 entering into a socket in a side of the light casing, this being the simplest form of tilting headlight construction which I use and which is illustrated in Fig. 7. A slightly modified form of construction is illustrated in Figs. 3, 5 and 6, there being provided outstanding lugs 7 attached to each side of the casing and each of which receives one of the vertically extending legs of a U-shaped member 8, each member being secured to a lug 7 by a set screw. The opposite leg of each U-shaped member 8 passes alongside a sleeve 9 similar in all respects to the sleeve 5 heretofore described, one being mounted at the upper end of each arm 4 of the bracket. A pivot pin 10 extends from each sleeve 9 and seats in a socket formed in said adjacent leg of the member 8, this permitting a ready tilting of the headlight about a horizontal axis so as to direct the light to points immediately in front of the vehicle.

A pair of tubes 11 lead from points directly back of the headlights to and alongside the steering post 2. Rods 12 extend through these tubes, one being attached to each of the headlights by a screw 13 which threads into the headlight casing.

A plate 15 is connected by a clip 16 to the steering post 2 and has positioned alongside and attached thereto another plate 17, a space being provided between the plates in which is pivotally mounted the lever 18, both wires 12 entering between the plates and attaching to this lever.

The operation of the device is very simple consisting merely in turning the lever 18 to different positions. As shown in Fig. 3, the headlights are in their usual and normal position in which the light is thrown to a point far in advance of the vehicle. By moving the lever downwardly rods 12 sliding through the tubes 11 tilt the headlight casings about their pivots so that the light is reflected directly in front of the vehicle. The friction of the rods in the tubes is sufficient to hold the headlights in any position to which they may be turned.

This construction is very simple and economical in manufacture and may be easily installed and operated. It has all of the advantages of any dimming device so far as removing the glare of the lights and avoiding confusion to any one in front of the lights and at the same time has the added advantage that none of the light is lost or eliminated at this time when the entire light is most needed. Furthermore, in driving at night-time it is greatly to the advantage of one driving a motor vehicle that the road directly in front of his machine shall be fully revealed.

I claim:—

1. In combination in a motor vehicle having a steering post, a pair of brackets each having spaced apart vertical arms mounted at the front of said vehicle, a lamp mounted to turn on a substantially horizontal axis between said arms of each bracket, tubes having forward ends positioned back of the lamp and leading to and alongside of the steering post, wires one connected to the back of each lamp and passing through said tubes, and a lever pivotally mounted at one end on the steering post to which both of said wires are secured between the ends of the lever.

2. In combination in a motor vehicle having a steering post, a bracket adjacent the front of the vehicle having spaced apart vertical arms, a lamp mounted between said arms to turn on a substantially horizontal axis, a tube having its forward end located back of the lamp and leading to and alongside the steering post, a wire attached to the back of the lamp leading through the tube, a plate attached to the steering post, a second plate secured to and spaced a distance from the first plate, and a lever between and pivotally mounted at one end to the plates, the free end of said lever extending beyond the plates, said wire being secured to the lever between the ends thereof.

3. In combination in a motor vehicle, a bracket located adjacent the front of the vehicle having upright spaced apart arms, a lamp located between said arms, a lug secured to the lamp adjacent each arm, a U-shaped member having one leg connected to each lug, horizontal pivots on each arm seated in sockets in the other leg of said U-shaped member, a wire connected to the back of the lamp, a tube through which said wire passes, and a lever pivotally mounted on the vehicle with which the rear end of the wire connects for operation of the lamp, substantially as described.

In testimony whereof I affix my signature.

CHARLES V. DEAN.